3,293,225
METHOD FOR PRODUCING STABILIZED
POLYMERS OF δ-VALEROLACTONE
Ryoichi Wakasa, Kazuo Saotome, and Yasuto Kodaira, all of Tokyo, Japan, assignors to Asahi Kasei Kogyo Kabushiki Kaisha, Kita-ku, Osaka, Japan
No Drawing. Filed Feb. 4, 1964, Ser. No. 342,536
Claims priority, application Japan, Feb. 6, 1963, 38/4,726
4 Claims. (Cl. 260—78.3)

This invention relates to polyesters having plasticizing effects.

Heretofore, several aliphatic polyesters have been known as plasticizers for polyvinyl chlorides and the like, in addition to esters of phthalic, adipic and sebacic acids.

An object of the present invention is to produce a stabilized polymer of δ-valerolactone, thereby to provide a novel polyester having excellent efficiency as a plasticizer.

Conventionally known polyester plasticizers have been stabilized by esterifying the terminal groups of molecules of, for example, a polyester composed of adipic acid and ethylene glycol. These polyester plasticizers are non-volatile and have desirable efficiencies, unlike the aforesaid low molecular weight plasticizers, but suffer from such drawbacks that their great expense and poor low temperature characteristics.

Although δ-valerolactone was considered to be prepared only with difficulty, the present inventors have found a markedly advantageous method for producing δ-valerolactone from 1,1,1,5-tetrachloropentane, which is easily obtainable from telomerization of ethylene with carbon tetrachloride. It has been also deemed that poly-δ-valerolactone had no practical value, since it was readily dissociated into monomers on heating.

When δ-valerolactone is polymerized in the presence of an initiator of a diol such as ethylene glycol, there is formed a polymer represented by the following chemical formula:

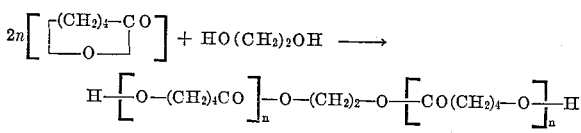

The molecules of the above polymer have hydroxyl groups at the terminals and, on heating, the polymer is easily disassociated into monomers.

As a result of detailed research on the reaction mechanism of thermal dissociation of said polymer, the present inventors have found that the dissociation reaction is induced by the terminal hydroxyl groups and the polymer is dissociated, in succession, from its terminals. It has further been discovered that when the terminal hydroxyl groups of the polymer molecules are acylated, or reacted with isocyanate to form urethane linkages, the polymer becomes extremely stable to heat and is no longer dissociated into monomers.

The present invention comprises the following two stage-reactions. The first stage is the preparation of poly-δ-valerolactone having hydroxyl groups at the terminals. δ-valerolactone is polymerized by using as an initiator a compound containing more than one functional group having active hydrogen in the molecule. The polymerization progresses sufficiently by only use of an initiator even in the absence of a catalyst, but proceeds rapidly when an acid or alkali is added as a catalyst. The functional groups having active hydrogen which initiates the reaction are hydroxyl and amino groups. Among these initiators, diamines such as ethylenediamine and hexamethylenediamine and amino alcohols such as ethanolamine are also preferable in addition to diols.

In the second stage, the thus prepared poly δ-valerolactone having terminal hydroxyl group is reacted either with an acylating agent to convert the active terminals into acyl groups, or with an isocyanate compound to convert the active terminals into urethane linkages, whereby the polymer is stabilized.

In case δ-valerolactone is polymerized in the presence of an alcoholate, for example, prepared by adding to a diol two times the mols based on the mols of diol of an alkali metal, there is formed a polymer having terminal alcoholate groups. Therefore, when various acyl chlorides are reacted with the polymer, an acylation reaction immediately takes place such that the reactions of both stages are complete within a markedly short period of time. Usable acyl chloride compounds are chlorides of aliphatic and aromatic organic acids such as acetyl and benzoyl chlorides. In case a polymer having free hydroxyl groups on the terminals is obtained, it is ordinarily acylated with an acid anhydride such as acetic anhydride, whereby a product having desirable properties is formed. It is also possible to stabilize the polymer by converting the terminal hydroxyl groups in tourethane linkages, using various aliphatic isocyanates, such as alkyl isocyanate, and aromatic isocyanates, such as phenyl isocyanate.

As illustrated above, there are various modes of practice of the present invention which are variable to a wide scope according to the desired object. The properties of the products vary considerably depending on the kind of polymerization initiator, the molecular weight of the polymer, and the species of terminal stabilizer. The product most suitable for general uses as a plasticizer for polyvinyl chlorides is ordinarily obtained by polymerizing δ-valerolactone in the presence of ethylene glycol as a polymerization initiator to form a polymer having a molecular weight of 500 to 2000 and acetylating the terminal hydroxyl groups of the polymer molecules with acetic anhydride. The polymerization reaction is carried out by adding a small amount of initiator to δ-valerolactone and heating, in case no catalyst is employed, the mixture at 120°–180° C. for more than several hours. If a catalyst is added, the reaction proceeds rapidly even at a temperature below 100° C. to form a polymer having terminal hydroxyl groups. When the acetylation is to be effected by use of acetic anhydride, it is sufficient to heat the mixture of polymer and acetic anhydride for a few hours at above 60° C. or at the boiling point of acetic anhydride. The product is evaporated or washed with water to remove acetic anhydride and acetic acid, whereby the stabilized polymer is purified. The resulting polymer is liquid at above 40° C., even when it is high in molecular weight, and has a sufficient miscibility with polymers such as polyvinyl chlorides and the like. Further, a shaped polyvinyl chloride formed by using the thus prepared polymer as a plasticizer is particularly excellent in low temperature characteristics as compared with one produced by using a conventional polyester plasticizer. The reason therefor may be illustrated as follows:

In the poly-δ-valerolactone, ester groups rich in intermolecular cohesion energy are arranged by being interposed with 4 methylene groups so that the flexibility of the polymer molecule as a plasticizer is not lost even at low temperatures.

The present invention will be illustrated with reference to the following examples:

*Example 1*

To 60 parts of δ-valerolactone, a ¹⁄₂₀ mol equivalent of ethylene glycol was added and the mixture was reacted in an inert gas at 180° C. for 14 hours. The product was dissolved in alcohol, cooled to −20° C. and recrystallized to obtain 57 parts of a polymer having an average molecular weight of 1460. The acid number of the polymer was 1.6. To the polymer, nearly the same amount of acetic anhydride was added and the mixture was heated and reacted at 100° C. for 5 hours. The reaction product was heated under reduced pressure, while introducing dry air, and distilled until the remaining acetic anhydride and acetic acid were removed, whereby 60 parts of a product was obtained. The product was analyzed by infrared spectrum to observe no carboxyl nor hydroxyl groups.

A polyvinyl chloride sheet plasticized with the thus obtained polymer showed the following properties.

Composition:
  Polyvinyl chloride
    (for shaping) _____ 10 parts.
  δ-valerolactone polymer _____ 50 parts.
  Barium stearate _____ 2 parts.
  Masticating temperature _____ 150°160° C., for 10 minutes.

Plasticizing efficiency:
  100% modulus (kg./cm.$^2$) _____ 130.
  Tensile strength (kg./cm.$^2$) _____ 200.
  Elongation (percent) _____ 240.

Example 2

To 60 parts of δ-valerolactone, a 1/30 mol equivalent of sodium metal alcoholate of tetramethylene glycol (1,4) was added and the mixture was allowed to stand at room temperature for 3 hours to be polymerized. To the resulting polymer, 10 parts of benzoyl chloride was added dropwise at room temperature while stirring it in a benzene solution. After the addition, the solution was thoroughly washed with a 5% aqueous sodium carbonate solution and then with water to remove benzene, whereby 61 parts of a δ-valerolactone polymer having terminal benzoyl groups was obtained. The infrared spectrum of the polymer showed the presence of no free hydroxyl nor carboxyl groups. When measured by cryoscopic method, the polymer showed a molecular weight of 2420.

The polymer thus obtained has a sufficient plasticizing effect for polyvinyl chloride.

Example 3

To 60 parts of δ-valerolactone, a 1/20 mol equivalent of ethylene diamine was added and the mixture was heated and reacted at 150° C. for 8 hours. The reaction product was recrystallized with alcohol to obtain 58 parts of a polymer having a molecular weight of 1420. The acid number of the polymer was 1.2. To the resulting polymer, phenyl isocyanate in a calculated amount equimolar to the hydroxyl groups of the polymer was added in benzene solution, and the mixture was heated, while stirring, at 50° C. for 2 hours. From the reaction product, benzene was distilled off to obtain 62 parts of a polymer having terminal urethane linkages. The polymer has a sufficient plasticizing effect for polyvinyl chloride.

What we claim is:

1. A method for producing a polymer, comprising polymerizing δ-valerolactone in the presence of an initiator having in its molecule more than one functional group selected from the class consisting of hydroxyl and amino groups, and acylating the resulting polymer to convert the terminal hydroxyl groups of the polymer into ester linkages, and thereby heat stabilize the polymer.

2. A method of claim 1, wherein the polymer is acylated by reacting with an acid anhydride.

3. A method of claim 1, wherein the polymer is acylated as reacting with an acid halide.

4. A method for producing a polymer, comprising polymerizing δ-valerolactone in the presence of an initiator having in its molecule two functional groups selected from the class consisting of hydroxyl and amino groups, and reacting the resulting polymer with an isocyanate compound to convert the terminal hydroxyl groups of the polymer into urethane linkages, and thereby heat stabilize the polymer.

References Cited by the Examiner

UNITED STATES PATENTS

| | | | |
|---|---|---|---|
| 2,455,731 | 12/1948 | Caldwell | 260—78.3 |
| 2,917,410 | 12/1959 | Vitalis | 260—78.3 |
| 3,169,945 | 2/1965 | Hostettler et al. | 260—78.3 |

JOSEPH L. SCHOFER, *Primary Examiner.*

L. WOLF, *Examiner.*

L. G. CHILDERS, *Assistant Examiner.*